United States Patent
Mohrschladt et al.

(10) Patent No.: US 6,590,064 B1
(45) Date of Patent: *Jul. 8, 2003

(54) USE OF HETEROGENEOUS CATALYSTS IN METHODS FOR THE PRODUCTION OF POLYAMIDES

(75) Inventors: Ralf Mohrschladt, Schwetzingen (DE); Volker Hildebrandt, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/889,158

(22) PCT Filed: Jan. 13, 2000

(86) PCT No.: PCT/EP00/00235

§ 371 (c)(1), (2), (4) Date: Jul. 11, 2001

(87) PCT Pub. No.: WO00/42090

PCT Pub. Date: Jul. 20, 2000

(30) Foreign Application Priority Data

Jan. 13, 1999 (DE) .......................... 199 01 013

(51) Int. Cl.⁷ .................. C08G 69/14; C08G 69/28; C08G 73/10; C08G 69/06
(52) U.S. Cl. .............. 528/310; 528/312; 528/320; 528/321; 528/323; 528/332; 528/335; 528/336; 528/480; 528/489; 526/65
(58) Field of Search ................. 528/310, 312, 528/320, 321, 322, 336, 323, 335, 480, 489, 332

(56) References Cited

U.S. PATENT DOCUMENTS

| | | | |
|---|---|---|---|
| 4,049,638 A | 9/1977 | Doerfel et al. | 260/78 |
| 4,327,208 A | 4/1982 | Lehr et al. | 528/323 |
| 5,149,758 A | 9/1992 | Matthies | 528/318 |
| 5,973,105 A | 10/1999 | Wiltzer et al. | 528/323 |
| 6,353,085 B1 * | 3/2002 | Mohrschladt et al. | 528/310 |

FOREIGN PATENT DOCUMENTS

| | | |
|---|---|---|
| DE | 24 43 566 | 1/1976 |
| DE | 25 01 348 | 7/1976 |
| DE | 29 48 865 | 6/1980 |
| DE | 43 24 616 | 1/1995 |
| DE | 198 08 190 | 9/1999 |
| EP | 0 000 397 | 1/1979 |
| EP | 0 005 466 | 11/1979 |
| EP | 0 462 476 | 12/1991 |
| WO | WO 97/08223 | 3/1997 |

* cited by examiner

Primary Examiner—P. Hampton-Hightower
(74) Attorney, Agent, or Firm—Keil & Weinkauf

(57) ABSTRACT

Described is the use of metal oxides as heterogeneous catalysts in a process for producing polyamides by polymerization of lactams and optionally further polyamide-forming monomers wherein the metal oxides are used in a form which permits mechanical removal from the reaction mixture and are removed from the reaction mixture during or after the polymerization, to reduce the extractables content of the polyamide obtained.

9 Claims, 1 Drawing Sheet

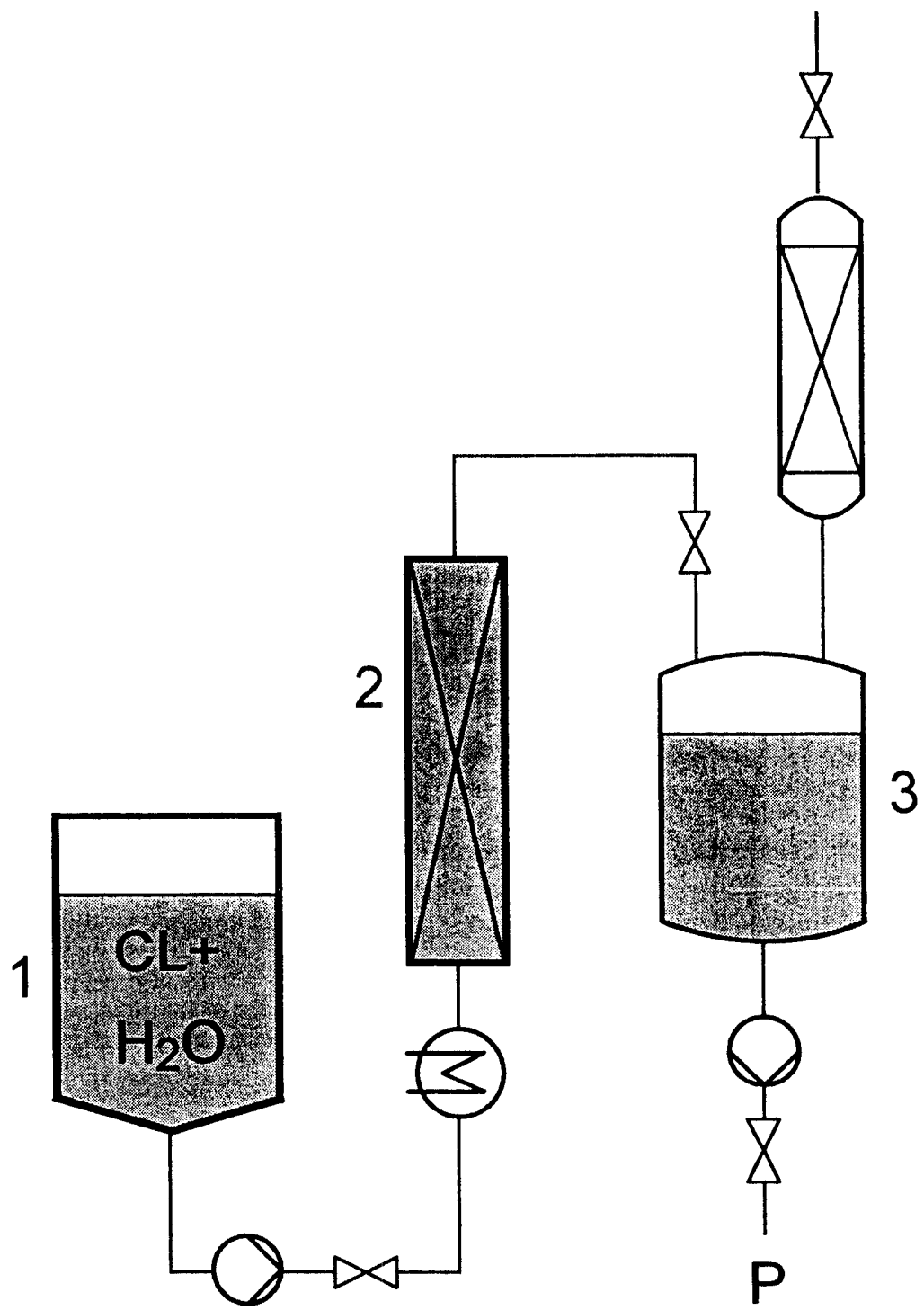

USE OF HETEROGENEOUS CATALYSTS IN METHODS FOR THE PRODUCTION OF POLYAMIDES

This invention relates to the use of metal oxides as heterogeneous catalysts in a process for producing polyamides by polymerization of lactams.

Polyamides based on ε-caprolactam are used for producing fiber, film and moldings. However, the hydrolytic polymerization of ε-caprolactam, which is one of the most important processes for producing nylon-6, does not go to completion. The crude polymer formed from caprolactam therefore includes a high level of ε-caprolactam and of low molecular weight reaction products (oligomer). Since both oligomer and caprolactam monomer are soluble and extractable in water, the level of low molecular weight constituents in the polymer is also known as its extractables content.

To prevent any impairment of product quality and of processing properties, for example during injection or extrusion molding or during spinning, the extractables content has to be lowered.

The requisite extraction is usually carried out with water at elevated temperatures, as described in DE-A 2 501 348, for example.

To increase the yield of the polymerization and to avoid any adverse impact on the environment, aqueous extracts are not disposed of as waste, but are recycled. To this end, for example, they are concentrated or extracted to be able to return their caprolactam monomer content into the polymerization.

The lower solubility of oligomer and especially dimer in the chips is not the least reason why complicated and energy-intensive processing steps have to be used for the extraction in order that polyamides of satisfactory quality may be obtained. In existing processes, caprolactam monomer is used as a solubilizer for lactam oligomer in the extraction of nylon-6. DE-A-43 24 616 therefore proposes adding caprblactam monomer to the water at the start of the extraction.

Processes are also known in which the extractables content is lowered by vaporizing the monomer and oligomer out of the polymer. DE-A-29 48 865 discloses a demonomerization process wherein the polymer is subjected to a vacuum in the molten state and in the form of thin films.

All the processes mentioned have the disadvantage of requiring in some instances multistage, costly and energy-intensive steps to demonomerize the polymer and to work up the aqueousextract.

It is therefore advantageous to produce polyamides which have a reduced extractables content and especially dimer content even in the unextracted state, so that the technical and economic effort needed to extract the low molecular weight constituents and to work up the aqueous extract can be reduced.

It is an object of the present invention to provide a process for producing polyamide where the formation of dimer and higher oligomer and the presence of monomer in the polymer is restricted and the polyamides produced thus have a low extractables content even before any extraction.

We have found that this object is achieved according to the invention by the use of metal oxides as heterogeneous catalysts in a process for producing polyamides by polymerization of lactams and optionally further polyamide-forming monomers wherein the metal oxides are used in a form which permits mechanical removal from the reaction mixture and are removed from the reaction mixture during or after the polymerization, to reduce the extractables content of the polyamide obtained.

A similar process is described in DE-A-198 08190, which has an earlier priority date than the present invention but was unpublished at the priority date of the present invention.

To produce low-extractables polyamides in the process of the invention, ε-caprolactam and optionally other polyamide-forming monomers are reacted, preferably continuously, in the presence of metal oxides which do not remain in the reaction mixture. Surprisingly, the process provides for a marked reduction in the level of dimer, the extraction of which is particularly difficult because of its solubility behavior in water.

The advantage of the present invention is that the total amount of low molecular weight constituents and especially dimers which have to be removed from the polymer in the subsequent extraction operation is reduced. This not only shortens the residence time in the extractor and thus raises the space-time yield, but also reduces the amount of extract to be worked up or disposed of. More particularly, the yield of dimers as well as of trimers and tetramers, which are more critical in removal and reuse than monomers can be reduced. Moreover, the reaction times may be shortened.

According to the invention, an aqueous lactam solution which optionally additionally contains other polyamide-forming monomers and has a water content of from 0.05 to 20% by weight, preferably of from 1 to 10% by weight, particularly preferably from 2 to 6% by weight, is reacted batchwise and preferably continuously in the melt phase at from 180 to 290° C. If desired, before being introduced into subsequent reaction stages, the monomers are melted and mixed with water in a makeup tank.

The metal oxide used can be any known metal oxide such as zirconium oxide, aluminum oxide, magnesium oxide, cerium oxide, lanthanum oxide and preferably titanium oxide as well as beta-zeolite and sheet-silicate. It was found that even silica gel and doped metal oxides, doped with ruthenium, copper or fluoride, for example, may distinctly reduce the extractables content. Preference is given to using metal oxides which are Broensted acidic. Particular preference is given to titanium dioxide in the anatase form. The anatase fraction is preferably at least 70%, particularly preferably at least 90%, especially 100%. According to the invention, the metal oxide bodies have a shape and size which permits mechanical separation of the polymer melt from the catalyst, for example by means of sieves and filters. The proposal is for the catalyst to be used in extrudate chip form or as coating on packing elements.

In another embodiment, the lactam is reacted with homogeneously dissolved acidic cocatalysts or a mixture of various catalytically active compounds in the presence of the abovementioned heterogeneous catalysts. The cocatalysts used here are preferably acidic catalysts selected from organic mono- and dicarboxylic acids, inorganic acids, their salts or mixtures thereof, such as the abovementioned carboxylic acids, terephthalic acid, adipic acid, propionic acid and isophthalic acid or oxygen-containing phosphorus compounds, especially phosphoric acid, phosphorous acid, hypophosphorous acid, the alkali metal and alkaline earth metal salts and ammonium salts, or oxygen-containing sulfur compounds, especially sulfuric acid and sulfurous acid.

ONE-STAGE PROCESS

If the mixture of starting materials is used in one reaction stage, this reaction stage preferably contains, the fixed or dumped bed of metal oxide bodies within the confines of the reactor in which the reaction mixture is present as a single liquid phase. In order that a high molecular weight may be achieved, the reactor should allow for the removal of water and an adequate residence time. Preferably, the polymerization in the single-stage embodiment is for that reason carried out in an upright downward-flow tube, a VK tube, which has a gas phase in the upper part. In this embodiment, the melt phase flows through the dumped metal oxide bodies. The reaction temperatures are set within the range from 180° C. to 270° C., preferably within the range from 190° C. to 250° C., particularly preferably within the range from 200 to 230° C. In a particularly preferred embodiment, the VK tube has a continuous or discontinuous temperature gradient whereby the temperature preferably rises from 180° C.–250° C. in the upper part of the flow tube to 240° C.–280° C. upstream of the outlet in the lower part of the flow tube.

TWO-STAGE PROCESS

The polymerization is preferably carried out in at least two reaction stages, the first stage being carried out under an elevated pressure and the second stage effecting the removal of a gas phase which contains condensation products such as water. The metal oxide bodies may be used in all stages according to the invention, but are particularly preferably used in the first stage.

Stage 1

The pressure in the first process stage is preferably set so that the reaction mixture is present as a single liquid phase. The reaction mixture has a bulk temperature of generally from 180° C. to 290° C., preferably from 190° C. to 250° C., particularly preferably from 200° C. to 230° C. The residence time is generally from 10 min to 10 hours, preferably from 0.5 to 8 hours, and particularly preferably from 1 to 4 hours.

Stage 2

The pressure in stage 2 is selected so that there is a liquid phase, which contains the polymer, and a gaseous phase. The pressure is preferably within the range from 0.01 to $10 \times 10^5$ Pa. The bulk temperature of the reaction mixture is generally from 220° C. to 290° C., preferably from 230° C. to 270° C., particularly preferably from 240 °C. to 260° C. when a catalyst is used.

The removal of the gas phase may be effected by using stirred or unstirred separating tanks or tank batteries and also by the use of evaporator apparatuses, for example by means of circulatory evaporators or thin-film evaporators, as by filmtruders or by annular disk reactors, which ensure an enlarged phase interface. Reserve pumping of the reaction mixture or the use of a loop reaction may be necessary to enlarge the phase interface. Furthermore, the removal of the gas phase can be furthered by the addition of water vapor or inert gas into the liquid phase. If a heterogeneous catalyst is likewise used in the second stage, this catalyst is preferably present as a dumped bed—in which case no dynamic mixing elements should be installed—or as a coating on reactor internals. If the degree of polymerization is sufficient, the polymer melt obtained can be discharged from the second stage for example with the aid of a gear pump, cooled in a water bath and then further processed by process steps known to one skilled in the art, for example by a extrusion, extraction, pigmenting, tempering, etc.

The residence time in reaction stage 2 depends on the water content of the mixture, on the reaction temperature and on the reactor pressure and also on the degree of polymerization desired for the product at the end of the reaction, time. It is generally within the range from 0.1 to 15 hours, preferably within the range from 0.5 to 8 hours, particularly preferably within the range from 1 to 4 hours. The bulk temperature of the reaction mixture is generally from 230° C. to 300° C., preferably from 240° C. to 280° C., particularly preferably, from 250° C. to 270° C., without use of a catalyst.

THREE-STAGE PROCESS

The three-stage embodiment according to the invention, as well as the above-described stages of the two-stage process, includes a further reactor, which is preferably operated without a metal oxide dumped bed.

Depending on the product properties desired, the reaction mixture in this stage is present as a single liquid phase or as a gaseous/liquid two-phase system: If the molecular weight of the polymer melt which is discharged from the second stage is sufficiently high, it will be possible to use, for example, a flow tube in which the reaction mixture is present as a single liquid phase and in which static mixers are utilized to add chain regulators, fillers, stabilizers or other additives and pigments. However, if the molecular weight is to be increased further, it is advisable to use reactors or apparatuses which permit the removal of water (see above). This embodiment is preferred when the second stage is likewise fitted out with metal oxide bodies. In this case, the invention provides that an excessive viscosity buildup in the second stage is avoided in order that effective separation of the reaction mixture from the metal oxide bodies may be ensured.

The residence time in reaction stage 3 likewise depends on the water content of the mixture, on the reaction temperature and on the reactor pressure and also on the degree of polymerization desired for the product at the end of the reaction time. It is generally within the range from 0 to 15 hours, preferably within the range from 0.5 to 8 hours, particularly preferably within the range from 1 to 4 hours. The pressure is chosen so that there is a liquid phase, which contains the polymer, and a gaseous phase, and is preferably within the range from 0.01 to $3 \times 10^5$ Pa.

In the context of the process of the invention it is also possible to carry out a chain extension or a branching or a combination of the two. To this end, known substances for branching or for chain-extending polymers are added to the reaction mixture. The substances may be added not only to the starting mixture but also to the reaction mixture which is postcondensed. Useful substances are:

Trifunctional amines or carboxylic acids as branching agents or crosslinkers. Examples of suitable at least trifunctional amines or carboxylic acids are described in EP-A-0 345 648. The at least trifunctional amines have at least three amino groups which are capable of reaction with carboxylic acid groups. They preferably do not have any carboxylic acid groups. The at least trifunctional carboxylic acids have at least three carboxylic acid groups which are capable of reaction with amines and which can also be present, for example, in the form of their derivatives, such as esters. The carboxylic acids preferably do not contain any amino groups capable of reaction with carboxylic acid groups. Examples of suitable carboxylic acids are trimesic acid, trimerized fatty acids, prepared for example from oleic acid and having from 50 to 60 carbon atoms, naphthalenepolycarboxylic acids, such as, naphthalene-1,3,5,7-tetracarboxylic acid. The carboxylic acids are preferably defined organic compounds and not polymeric compounds.

Examples of amines having at least 3 amino groups are nitrilotrialkylamine, especially nitrilotriethaneamine, dialkylenetriamines, especially diethylenetriamine, trialkylenetetramines and tetraalkylenepentamines, the alkylene moieties preferably being ethylene moieties.

Furthermore, dendrimers can be used as amines. Dendrimers preferably have the general formula I

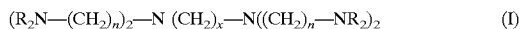
$(R_2N-(CH_2)_n)_2-N (CH_2)_x-N((CH_2)_n-NR_2)_2$   (I)

where
- R is H or $-(CH_2)_n-NR^1_2$, where
- $R^1$ is H or $-(CH_2)_n-NR^2_2$, where
- $R^2$ is H or $-(CH_2)_n-NR^3_2$, where
- $R^3$ is H or $-(CH_2)_n-NH_2$,
- n is an integer from 2 to 6, and
- x is an integer from 2 to 14.

Preferably, h is an integer from 3 to 4, especially 3, and x is an integer from 2 to 6, preferably from 2 to 4, especially 2. The radicals R can also have the stated meanings independently of one another. Preferably, R is a hydrogen atom or a $-(CH_2)_n-NH_2$ radical.

Suitable carboxylic acids are those having from 3 to 10 carboxylic acid groups, preferably 3 or 4 carboxylic acid groups. Preferred carboxylic acids are those having aromatic and/or heterocyclic nuclei. Examples are benzyl, naphthyl, anthracene, biphenyl, triphenyl radicals or heterocycles such as pyridine, bipyridine, pyrrole, indole, furan, thiophene, purine, quinoline, phenanthrene, porphyrin, phthalocyanine, naphthalocyanine. Preference is given to 3,5,3',5'-biphenyltetracarboxylic acid-phthalocyanine, naphthalocyanine, 3,5,5',5'-biphenyltetracarboxylic acid, 1,3,5,7-naphthalenetetracarboxylic acid, 2,4,6-pyridinetricarboxylic acid, 3,5,3',5'-bipyridyltetracarboxylic acid, 3,5,3',5'-benzophenonetetracarboxylic acid, 1,3,6,8-acridinetetracarboxylic acid, particularly preferably 1,3,5-benzenetricarboxylic acid (trimesic acid) and 1,2,4,5-benzenetetracarboxylic acid. Such compounds are commercially available or can be prepared by the process described in DE-A-43 12 182. If ortho-substituted aromatic compounds are used, imide formation is preferably prevented through the choice of suitable reaction temperatures.

These substances are at least trifunctional, preferably at least tetrafunctional. The number of functional groups can be from 3 to 16, preferably from 4 to 10, particularly preferably from 4 to 8. The processes of the invention are carried out using either at least trifunctional amines or at least trifunctional carboxylic acids, but not mixtures of such amines or carboxylic acids. However, small amounts of at least trifunctional amines may be present in the trifunctional carboxylic acids, and vice versa.

The substances are present in an amount from 1 to 50 µmol/g of polyamide, preferably from 1 to 35, particularly preferably 1 to 20, µmol/g of polyamide. The substances are preferably present in an amount from 3 to 150, particularly preferably from 5 to 100, especially from 10 to 70, µmol of equivalents/g of polyamide. The equivalents are based on the number of functional amino groups or carboxylic acid groups.

Difunctional carboxylic acids or difunctional amines are used as chain lengtheners. These have 2 carboxylic acid groups which can be reacted with amino groups, or 2 amino groups which can be reacted with carboxylic acids. The difunctional carboxylic acids or amines, other than the carboxylic acid groups or amino groups, do not contain any further functional groups capable of reaction with amino groups or carboxylic acid groups. Preferably, they do not contain any further functional groups. Examples of suitable difunctional amines are those which form salts with difunctional carboxylic acids. They can be linear aliphatic, such as $C_{1-14}$-alkylenediamine, preferably $C_{2-6}$-alkylenediamine, for example hexylenediamine. They can also be cycloaliphatic. Examples are isophoronediamine and laromine. Branched aliphatic diamines are likewise usable, an example being Vestamin TMD (trimethylhexamethylenediamine, from Hüls AG). Entire amines can each be substituted by $C_{1-12}$-alkyl, preferably $C_{1-14}$-alkyl, radicals on the carbon skeleton.

Difunctional carboxylic acids are, for example, those which form salts with difunctional diamines. They can be linear aliphatic dicarboxylic acids, which are preferably $C_{4-20}$-dicarboxylic acids. Examples are adipic acid, azelaic acid, sebacic acid, suberic acid. They can also be aromatic. Examples are isophthalic acid, terephthalic acid, naphthalenedicarboxylic acid, and also dimerized fatty acids.

The reaction mixture may further include additives and fillers, aliphatic and aromatic chain regulators such as mono- and bifunctional amines and acids and also substances for heat stabilization and to improve the dyeability of the polymer. Preference, is given to adding the substances which are not homogeneously dissolved in the reaction mixture, such as pigments and fillers, to the reaction mixture after the synthesis phases which take place in the presence of the fixed bed catalyst.

Pigments and dyes are generally present in amounts of up to 4%, preferably from 0.5 to 3.5%, especially from 0.5 to 3%, by weight.

The pigments for coloring thermoplastics are commonly known, see for, example R. Gächte. and H. Müller, Taschenbuch der Kunststoffadditive, Carl Hanser Verlag, 1983, pages 494 to 510. The first preferred group of pigments to be mentioned are white pigments such as zinc oxide, zinc sulfide, lead white (2 $PbCO_3$, $Pb(OH)_2$), lithopone, antimony white and titanium dioxide. Of the two most common crystal polymorphs (rutile and anatase) of titanium dioxide, the rutile form is preferred for use as white pigment for the molding compositions of the invention.

Black pigments which can be used according to the invention are iron oxide black ($Fe_3O_4$), spinel black (Cu(Cr, Fe)$_2O_4$), manganese black (mixture of manganese dioxide, silicon dioxide and iron oxide), cobalt black and antimony black and also, particularly preferably, carbon black, which is usually used in the form of furnace or gas black (see G. Benzing, Pigmente für Anstrichmittel, Expert-Verlag (1988), p. 78 ff.).

It will be appreciated that inorganic color pigments such as chromium oxide green or organic color pigments such as azo pigments and phthalocyanines can be used according to the invention to obtain certain hues. Such pigments are generally commercially available.

It can further be of advantage to use the abovementioned pigments or dyes in a mixture, for example carbon black with copper phthalocyanines, since this generally facilitates the dispersion of color in the thermoplastic.

Oxidation retardants and thermal stabilizers which can be added to the thermoplastic compositions of the invention include for example halides of metals of group I of the periodic table, e.g., sodium halides, potassium halides, lithium halides, optionally in conjunction with copper(I) halides, for example chlorides, bromides or iodides. The halides, especially of copper, may also contain electron-rich p-ligands. Examples of such copper complexes are copper halide complexes with triphenylphosphine, for example. It is further possible to use zinc fluoride and zinc chloride. Other possibilities are sterically hindered phenols, hydroquinones, substituted representatives of this group, secondary aromatic amines, optionally in conjunction with phosphorus-containing acids and salts thereof, and mixtures of these compounds, preferably in a concentration up to 1% by weight, based on the weight of the mixture.

Examples of UV stabilizers are various substituted resorcinols, salicylates, benzotriazoles and benzophenones, which are generally used in amounts of up to 2% by weight.

Lubricating and demolding agents, which are generally added to the thermoplastic composition in amounts of up to 1% by weight, are stearic acid, stearyl alcohol, alkyl stearates and N-alkylstearamides and also esters of pentaerythritol with long-chain fatty acids. It is also possible to use salts of calcium, of zinc or of aluminum of stearic acid and also dialkyl ketones, for example distearyl ketone.

The polyamides of the invention, especially nylon-6 and its copolymers, can be used for producing fibers, fabrics and materials of construction. Appropriate processes are described in EP-A-0 462 476, for example.

In a preferred embodiment, the level of low molecular weight constituents such as caprolactam, linear and cyclic oligomers in the polyamide produced according to the invention can be reduced by subjecting the polyamide to an extraction first with an aqueous solution of caprolactam and then with water and/or a gas phase extraction.

BRIEF DESCRIPTION OF THE DRAWINGS

The drawing shows in FIG. 1 in schematic form an apparatus for carrying out the process, where CL denotes caprolactam, 1 is a feed tank, 2 is a tubular reactor, 3 is a separator and P denotes polyamide.

The examples hereinbelow illustrate the invention.

EXAMPLES

The illustrative embodiments were realized using a two-stage apparatus (see FIG. 1). It was made up of a feed tank (1), a tubular reactor (2), which contains the catalyst bed, and a separator (3) for the subsequent condensation of the PA prepolymer. The reaction mixture was pumped by means of an HPLC piston pump through a heat exchanger in the tubular or prereactor (1 liter without $TiO_2$ bed) and then polycondensed in the separator (2 liters) at low pressures and thereafter discharged. To ensure adequate exchange of the reactants with the catalyst surface, the pressure in the prereactor was chosen so that the reaction mixture formed a single liquid phase. The reactions ended within a short period, that is 4 hours, and produced high conversions.

The products were chipped, extracted and analyzed with regard to viscosity and extractables. The process parameters and the corresponding viscosity and extractables values are summarized in Table 1.

ANALYSIS

The relative viscosity (RV) of the extracted products as a measure of the molecular weight buildup and degree of polymerization was determined in 1% strength by weight solution in 96% strength sulfuric acid at 25° C. using an Ubbelohde viscometer.

The polyamide samples were extracted with boiling water under reflux for 32 or 16 hours. The dry residue which was obtained on evaporating the aqueous extract and whose weight corresponds to the total extractables content of the polymer was analyzed by HPLC analysis.

The catalyst used was an extrudate produced from titanium dioxide from Finnti, Type S150, having a diameter of 4 mm and a length within the range from 5 to 20 mm. The titanium dioxide of the S150 catalyst was in the anatase form.

A water content of 2–2.5% by weight in the starting mixture in particular resulted in extracts having a very low dimer content and a low trimer and tetramer content.

TABLE 1

| Example | Prereactor | | | | Separator | | | Product | | Extract composition [% of extract weight] | | | | | | |
|---|---|---|---|---|---|---|---|---|---|---|---|---|---|---|---|---|
| | Water content [%] | Residence time [h] | T [°C.] | Pressure [bar] | Residence time [h] | T [°C.] | Pressure [bar] | RV | Extractables [%] | Monomer | Dimer | Trimer | Tetramer | Pentamer | Hexamer | Heptamer |
| 1 | 1 | 1 | 290 | 10 | 1 | 250 | 4.0 | 1.93 | 9.83 | 77.1 | 9.6 | 6.1 | | 3.3 | 0.9 | 0.6 |
| 2 | 1 | 1 | 250 | 10 | 3 | 250 | 1.5 | 2.08 | 9.80 | | | | | | | |
| 3 | 1 | 1 | 240 | 10 | 3 | 250 | 1.5 | 2.09 | 9.80 | | | | | | | |
| 4 | 2 | 1 | 230 | 10 | 3 | 240 | 1.5 | 2.05 | 9.43 | 83.3 | 5.4 | 5.5 | 3.7 | 2.0 | 1.1 | 0.9 |
| 5 | 2 | 1 | 240 | 10 | 3 | 240 | 1.5 | 2.06 | 9.50 | | | | | | | |
| 6 | 2 | 1 | 260 | 10 | 3 | 240 | 1.5 | 2.07 | 9.33 | 77.7 | 8.7 | 6.5 | 4.4 | 2.1 | 1.1 | 0.7 |
| 7 | 2 | 1 | 270 | 10 | 3 | 240 | 1.5 | 2.04 | 9.13 | 76.5 | 10.1 | 6.3 | 4.4 | 3.2 | 1.2 | 0.9 |
| 8 | 4 | 1 | 280 | 20 | 3 | 240 | 2.5 | 1.94 | 8.87 | 74.2 | 11.0 | 6.3 | 4.3 | 3.2 | 1.1 | 0.7 |
| 9 | 4 | 1 | 270 | 20 | 3 | 240 | 2.5 | 1.95 | 8.93 | 73.2 | 9.3 | 6.2 | 4.3 | 3.4 | 1.3 | 0.9 |
| 10 | 4 | 1 | 260 | 20 | 3 | 240 | 2.5 | 1.94 | 9.30 | 74.9 | 9.5 | 6.3 | 4.3 | 3.5 | 1.2 | 0.9 |
| 11 | 4 | 1 | 250 | 20 | 3 | 240 | 1.8 | 2.03 | 8.90 | 76.3 | 8.5 | 6.3 | 4.3 | 3.0 | 1.1 | 0.8 |
| 12 | 4 | 1 | 240 | 20 | 3 | 240 | 1.8 | 2.04 | 9.00 | 75.5 | 7.1 | 6.1 | 4.2 | 3.2 | 1.2 | 0.9 |
| 13 | 4 | 1 | 230 | 20 | 3 | 240 | 1.8 | 2.00 | 9.33 | 78.2 | 6.1 | 5.5 | 3.8 | 3.1 | 1.1 | 0.5 |
| 14 | 2 | 1 | 220 | 20 | 3 | 240 | 1.5 | 2.01 | 10.70 | 85.1 | 3.8 | 3.8 | 2.8 | 1.9 | 1.0 | 0.5 |
| 15 | 2 | 1 | 230 | 20 | 3 | 240 | 1.5 | 1.99 | 10.83 | 84.7 | 4.4 | 4.3 | 3.1 | 2.0 | 1.0 | 0.5 |
| 16 | 2 | 1 | 240 | 20 | 3 | 240 | 1.5 | 2.02 | 10.00 | 82.9 | 5.0 | 4.6 | 3.3 | 2.1 | 1.1 | 0.5 |
| 17 | 2 | 1 | 250 | 20 | 3 | 240 | 1.5 | 2.04 | 9.77 | 81.0 | 6.3 | 5.0 | 3.6 | 2.3 | 1.2 | 0.6 |
| 18 | 2 | 1 | 260 | 20 | 3 | 240 | 1.5 | 2.07 | 8.96 | 78.7 | 7.6 | 5.5 | 4.0 | 2.5 | 1.3 | 0.6 |
| 19 | 2 | 1 | 210 | 20 | 3 | 240 | 1.5 | 1.99 | 10.86 | 87.6 | 3.5 | 3.9 | 3.0 | 2.0 | 1.1 | 0.6 |
| 20 | 2 | 1 | 200 | 40 | 3 | 240 | 1.5 | 1.96 | 11.70 | 89.0 | 2.7 | 3.4 | 2.6 | 1.7 | 0.9 | 0.5 |
| 21 | 2.5 | 1 | 200 | 40 | 3 | 240 | 1.5 | 1.98 | 10.70 | 85.5 | 3.0 | 3.7 | 2.8 | 1.9 | 1.0 | 0.5 |

| Patent | Example | Extractables Content [% by weight]* | Monomer content [% by weight] | Dimer content [% by weight] | Trimer content [% by weight] | Tetramer content [% by weight] |
|---|---|---|---|---|---|---|
| EP 0 005 466 | 1 | — | 7.5 | 0.53 | — | — |
| | 2 | — | 6.8 | 0.49 | — | — |
| WO 97/08223 | 4 | 10.0 | 8.4 | 0.48 | 0.44 | 0.65 |
| EP 0 000 397 | 1 | 10.5 | — | — | — | — |
| | 2 | 13.5 | — | — | — | — |
| DE 2443566 | 1 | 11.4 | — | — | — | — |
| | 2 | 11.2 | | | | |
| | 3 | 10–11 | | | | |
| | 4 | 11 | | | | |
| EP 0 462 476 | 1 | 11 | — | — | — | — |
| | A | 11.8 | | | | |
| | 2 | 12.0 | | | | |
| | B | 11.3 | | | | |
| | 3 | 11.3 | | | | |

*The weight percentages are based on the pre-extraction mass of the product produced.

We claim:

1. The method of reducing the extractable content of polyamides in a process for producing polyamides by polymerization of lactams and optionally further polyamide-formino monomers, wherein ther polymerization is performed in the presence of metal oxides as heterogeneous catalysts wherein the metal oxides are used in a form which permits mechanical removal from the reaction mixture and are removed from the reaction mixture during or after the polymerization, and the polymerization is effected in two stages, the first stage being performed under an elevated pressure at which the reaction mixture with the exception of the heterogeneous catalyst forms a single liquid phase and the last stage being a postcondensation under pressure within the range from 0.01 to $10 \times 10^5$ Pa, wherein the heterogeneous catalyst is present in either or both stages.

2. The method of claim 1, wherefor the metal oxide catalysts are used in the form of chips, extrudates, fixed beds or catalyst-coated packing elements or internals.

3. The method of claim 1, wherefor the metal oxide catalysts are selected from the group consisting of zirconium oxide, aluminum oxide, magnesium oxide, cerium oxide, lanthanum oxide, titanium oxide, beta-zeolites and sheet-silicates.

4. The method of claim 3, wherefor the metal oxide catalyst used is titanium oxide which is at least 70% by weight present in the anatase form.

5. The method of claim 1, wherefor the metal oxide catalysts are used together with acidic cocatalysts homogeneously dissolved in the reaction mixture.

6. The method of claim 5, wherefor the acidic cocatalysts are selected from the group consisting of organic mono- and dicarboxylic acids, inorganic acids, their salts or mixtures thereof.

7. The method of claim 1, wherefor the polymerization of the lactams is performed in the presence of organic monocarboxylic acids, dicarboxylic acids or mixtures thereof as chain regulaors and/or cocatalysts.

8. The method of claim 1, wherefor the reaction is performed at from 180° to 290° C. when the heterogeneous catalyst is present and at from 230 to 300° C. when the heterogeneous catalyst is absent.

9. The method of claim 1, wherefor the reaction is performed in the presence of less than 10% by weight of water, based on the total reaction mixture.

* * * * *

UNITED STATES PATENT AND TRADEMARK OFFICE
CERTIFICATE OF CORRECTION

PATENT NO. : 6,590,064 B1
DATED : July 8, 2003
INVENTOR(S) : Mohrschladt et al.

It is certified that error appears in the above-identified patent and that said Letters Patent is hereby corrected as shown below:

Column 9,
Lines 26 and 27, "polyarnide-formino" should be -- polyamide-forming --;
Line 27, "ther" should be -- their --.

Column 10,
Line 26, "regulaors" should be -- regulators --.

Signed and Sealed this

Nineteenth Day of August, 2003

JAMES E. ROGAN
*Director of the United States Patent and Trademark Office*